(12) United States Patent
Liao et al.

(10) Patent No.: US 11,735,081 B1
(45) Date of Patent: Aug. 22, 2023

(54) INTELLIGENT DISPLAY ASSEMBLY FOR CNC MACHINE

(71) Applicant: GRAIN ELECTRONICS, INC., Taichung (TW)

(72) Inventors: Lu-Chia Liao, Taichung (TW); Chun-Yu Liao, Taichung (TW); Chun-Chun Liao, Taichung (TW)

(73) Assignee: GRAIN ELECTRONICS, INC., Taichung (TW)

(*) Notice: Subject to any disclaimer, the term of this patent is extended or adjusted under 35 U.S.C. 154(b) by 0 days.

(21) Appl. No.: 17/886,644

(22) Filed: Aug. 12, 2022

(51) Int. Cl.
*G09F 9/33* (2006.01)
*G09G 3/06* (2006.01)
*G09G 3/00* (2006.01)
*G05B 19/4155* (2006.01)

(52) U.S. Cl.
CPC ........... *G09G 3/06* (2013.01); *G05B 19/4155* (2013.01); *G09G 3/03* (2020.08); *G05B 2219/33099* (2013.01); *G09G 2370/16* (2013.01)

(58) Field of Classification Search
CPC . G09F 9/33; G09F 13/18; G09F 13/00; G09F 9/302; G09F 13/04; G08G 1/095
See application file for complete search history.

(56) References Cited

U.S. PATENT DOCUMENTS

| | | | | |
|---|---|---|---|---|
| 3,641,539 | A * | 2/1972 | Lesher | G08B 25/00 340/541 |
| 6,354,498 | B1 * | 3/2002 | Lutz | G07G 1/0054 186/59 |
| 7,866,546 | B1 * | 1/2011 | Vance | G07G 1/0009 235/383 |
| 10,452,052 | B2 * | 10/2019 | Rogers | G05B 19/4097 |
| 10,867,533 | B2 * | 12/2020 | Laforce | G09F 9/33 |
| 11,275,548 | B2 * | 3/2022 | Jones | G06F 1/1632 |
| 2012/0204455 | A1 * | 8/2012 | Mothaffar | G09F 13/22 40/606.03 |
| 2015/0233565 | A1 * | 8/2015 | Lee | F21K 9/60 362/555 |
| 2016/0379492 | A1 * | 12/2016 | Roy | E01F 9/662 340/907 |
| 2017/0301268 | A1 * | 10/2017 | Laforce | G09F 13/005 |
| 2018/0033259 | A1 * | 2/2018 | Cummings | G08G 1/056 |
| 2019/0043352 | A1 * | 2/2019 | Baek | F24S 25/10 |
| 2020/0364020 | A1 * | 11/2020 | Jones | G06F 3/1431 |
| 2021/0178545 | A1 * | 6/2021 | Tseng | B23Q 17/0971 |
| 2021/0405611 | A1 * | 12/2021 | Boswell | G05B 19/4188 |

* cited by examiner

*Primary Examiner* — Olga V Merkoulova
(74) *Attorney, Agent, or Firm* — Muncy, Geissler, Olds & Lowe, P.C.

(57) ABSTRACT

An intelligent display assembly includes a display and a microcontroller. The display is mounted to a CNC machine and provided with a light emitting module and a display module opposite to the light emitting module. The microcontroller is electrically connected with the CNC machine and the display, such that the microcontroller receives an operating status signal outputted by the CNC machine, and according to the operating status signal, the microcontroller controls the light emitting module to emit light and controls the display module to display processing information, such as processing time, processing quantity, waiting time, and failure time. This allows operators to grasp the processing information in real time and improve management efficiency.

3 Claims, 6 Drawing Sheets

INTELLIGENT DISPLAY ASSEMBLY FOR CNC MACHINE

BACKGROUND OF THE INVENTION

1. Field of the Invention

The present invention relates to a CNC machine and more particularly, to an intelligent display assembly for a CNC machine.

2. Description of the Related Art

In recent years, many companies have introduced automatic processing equipment for achieving the purposes of reducing personnel costs and improving processing yield. An indicator light (commonly known as a tricolor lamp) are usually provided by the automatic processing equipment to emit light of different colors for reminding operators of the current machining status. However, the conventional indicator light has only three colors to provide indication and warning functions. For the era of Industry 4.0, the aforementioned design is no longer sufficient, and thus it is very inconvenient to manage.

SUMMARY OF THE INVENTION

It is a primary objective of the present invention to provide an intelligent display assembly for a CNC machine, which allows operators to grasp processing information in real time and improve management efficiency.

To attain the above objective, the intelligent display assembly of the present invention comprises a display and a microcontroller. The display is mounted to a CNC machine and includes a light emitting module and a display module opposite to the light emitting module. The microcontroller is electrically connected with the CNC machine for receiving an operating status signal outputted by the CNC machine, and further, the microcontroller is electrically connected with the light emitting module and the display module so as to control the light emitting module to emit light and control the display module to display processing information in accordance with the operating status signal.

It can be seen from the above that the intelligent display assembly of the present invention provides different processing information with light of different colors to operators in real time for enhancing efficiency of managing the CNC machine.

Preferably, the processing information is transmitted by the microcontroller to a smart phone through a wireless transmission path. This allows the operators to view the processing information in real time.

Preferably, the processing information includes processing time, processing quantity, waiting time, and failure time.

Preferably, when the light emitting module emits green light, English and numbers are displayed alternately as the processing time. When the light emitting module emits yellow light, English and numbers are displayed alternately to indicate the waiting time. When the light emitting module emits red light, English and numbers are displayed alternately to indicate the failure time. When the light emitting module emits green light, English and numbers are displayed alternately to indicate the processing quantity.

Preferably, the display further includes a base and a transparent lampshade disposed on the base. The display module and the light emitting module are disposed at two opposite sides of the base and covered by the transparent lampshade for avoiding harsh light.

Preferably, the base can be designed as a cylinder or a square prism according to actual needs. If the base is the former type, the light emitting module and the display module are disposed at the front and back sides of the base. If the base is the latter type, one of the light emitting modules and one of the display modules are disposed at two opposite sides of the base, and the other of the light emitting modules and the other of the display modules are disposed at the other two opposite sides of the base.

Other advantages and features of the present invention will be fully understood by reference to the following specification in conjunction with the accompanying drawings, in which like reference signs denote like components of structure.

DETAILED DESCRIPTION OF THE INVENTION

Figure 1:
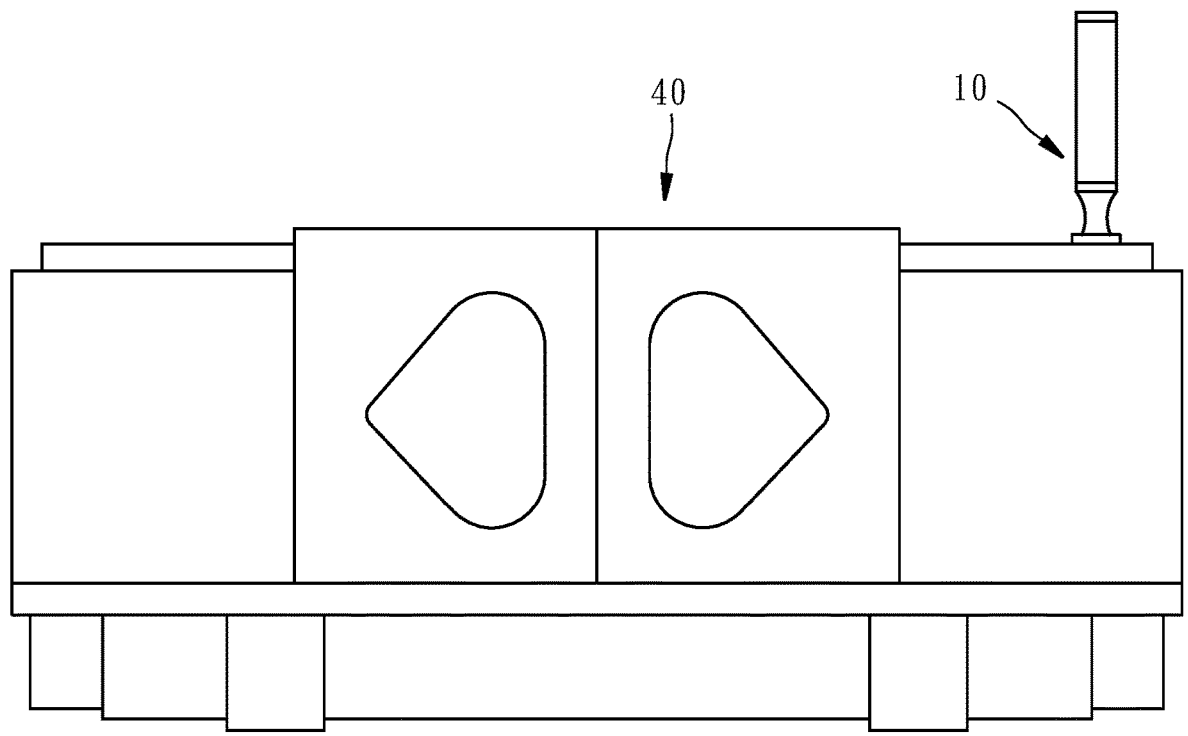
FIG. 1 is a schematic drawing of a CNC machine using an intelligent display assembly according to an embodiment of the present invention.

Referring to FIG. 1, an intelligent display assembly 10 is used for a CNC machine 40, comprising a display 20 and a microcontroller 30.

Figure 2:
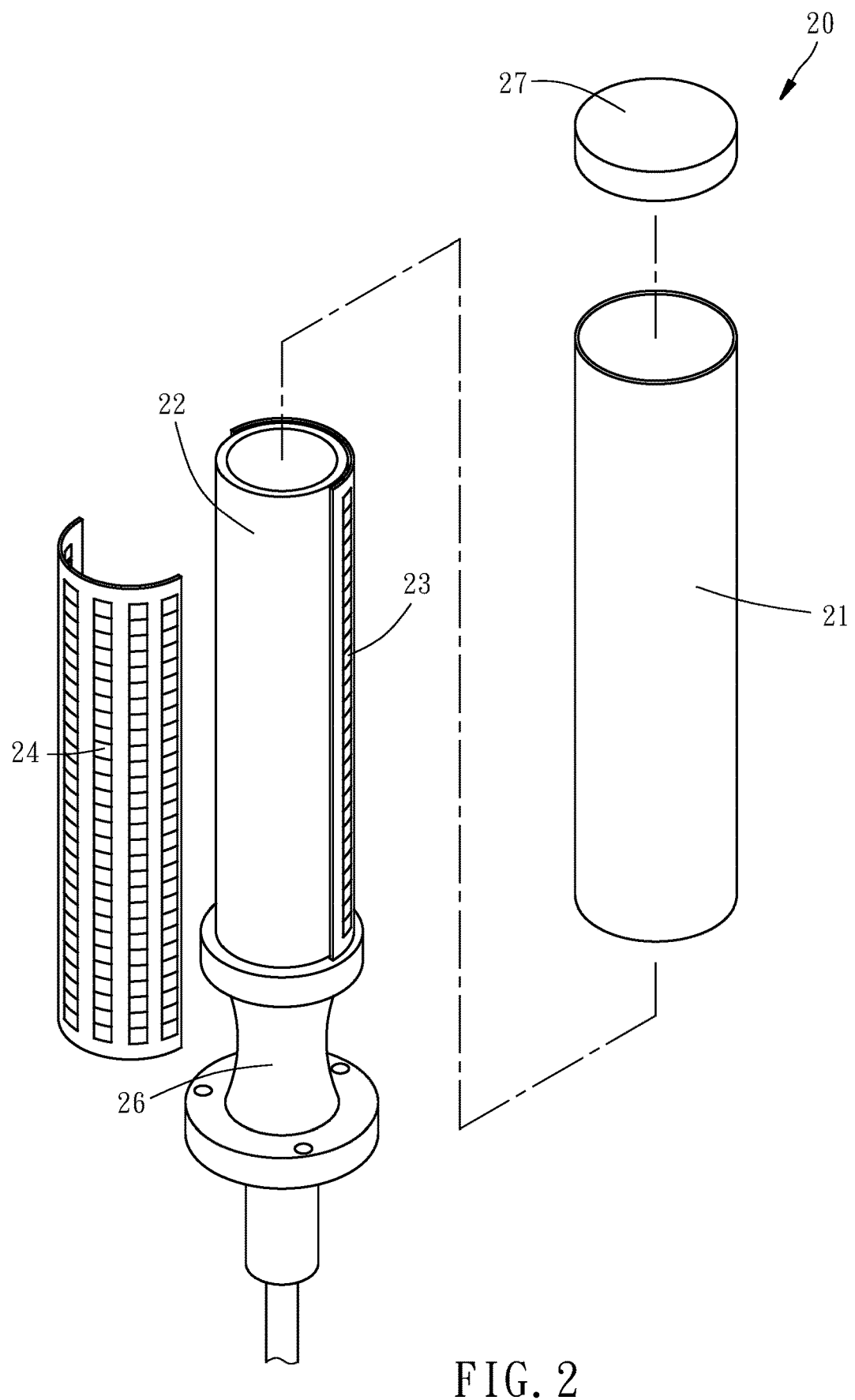
FIG. 2 is an exploded view of a display provided by the intelligent display assembly according to the embodiment of the present invention.
Figure 3:
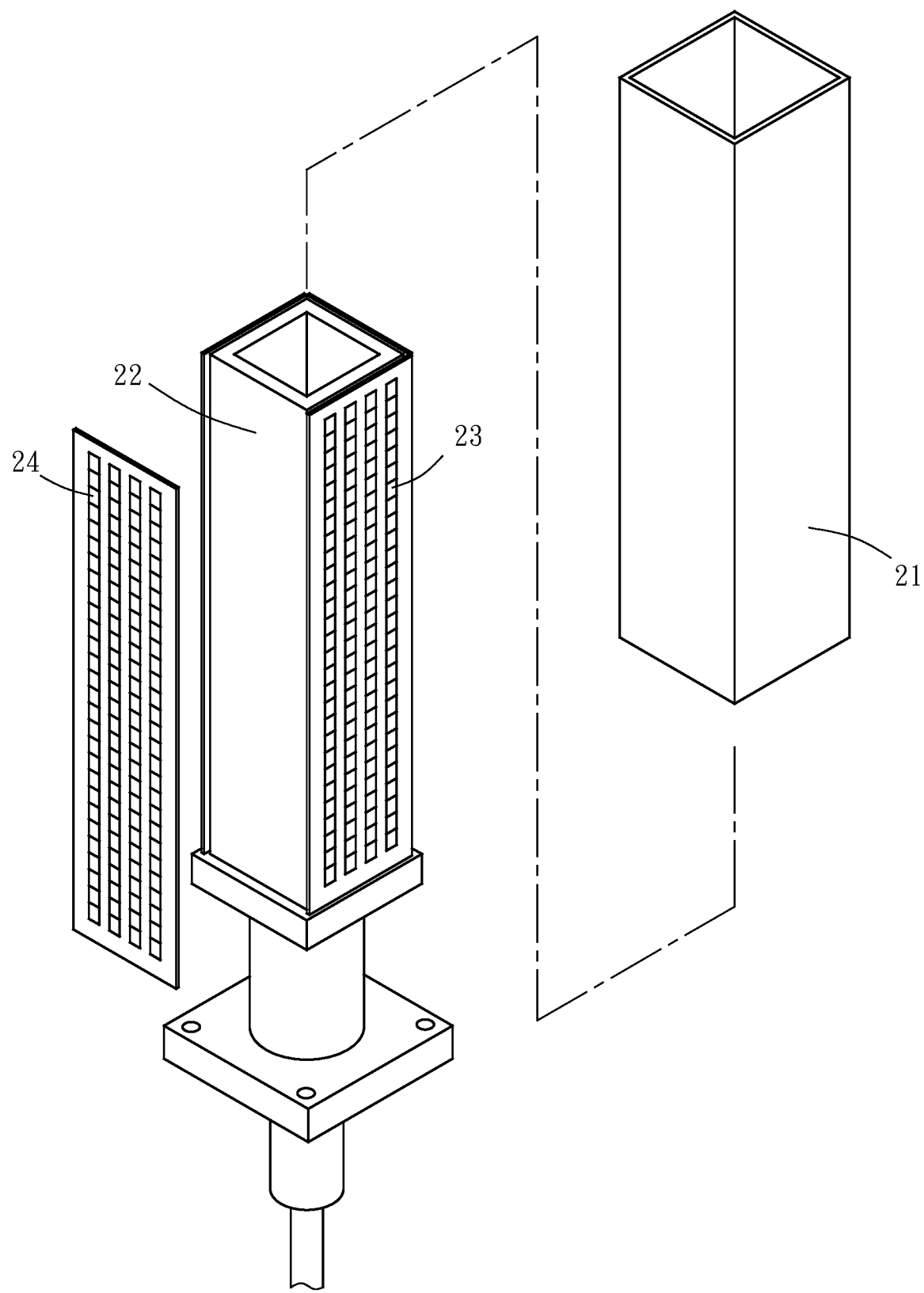
FIG. 3 is an exploded view of another type of the display provided by the intelligent display assembly according to the embodiment of the present invention.

The display 20 is mounted to the CNC machine 40. As shown in FIG. 2, the display 20 includes a base 22, a display module 24, a light emitting module 23, and a transparent lampshade 21. The bottom end of the base 22 is connected with a bottom support 26. The display module 24 is an LED array in this embodiment. The display module 24 is attached to the front side of the base 22 for displaying processing information 25 as shown in FIGS. 5a-5d. The light emitting module 23 is an LED array in this embodiment. The light emitting module 23 is attached to the back side of the base 22 for emitting light of different colors in accordance with different processing information 25. The transparent lampshade 21 is sleeved on the base 22 to cover the light emitting module 23 and the display module 24 for avoiding harsh light generated by the LED array. In addition, a top lid 27 is disposed on the top end of the base 22 for retaining the transparent lampshade 21. It needs to be added here that the base 22 and the transparent lampshade 21 are not limited to be a cylinder. They may be designed as square prisms according to actual needs. Under the situation that the base 22 is a square prism, as shown in FIG. 3, the display 20 provides two light emitting modules 23 and two display modules 24. One of the light emitting modules 23 and one of the display modules 24 are attached to two opposite sides of the base 22, and the other of the light emitting modules 23 and the other of the display modules 24 are attached to the other two opposite sides of the base 22. In other words, whether the base 22 is a cylinder or square prism, the light emitting module 23 and the display module 24 are attached to two opposite sides of the base 22.

Figure 4:
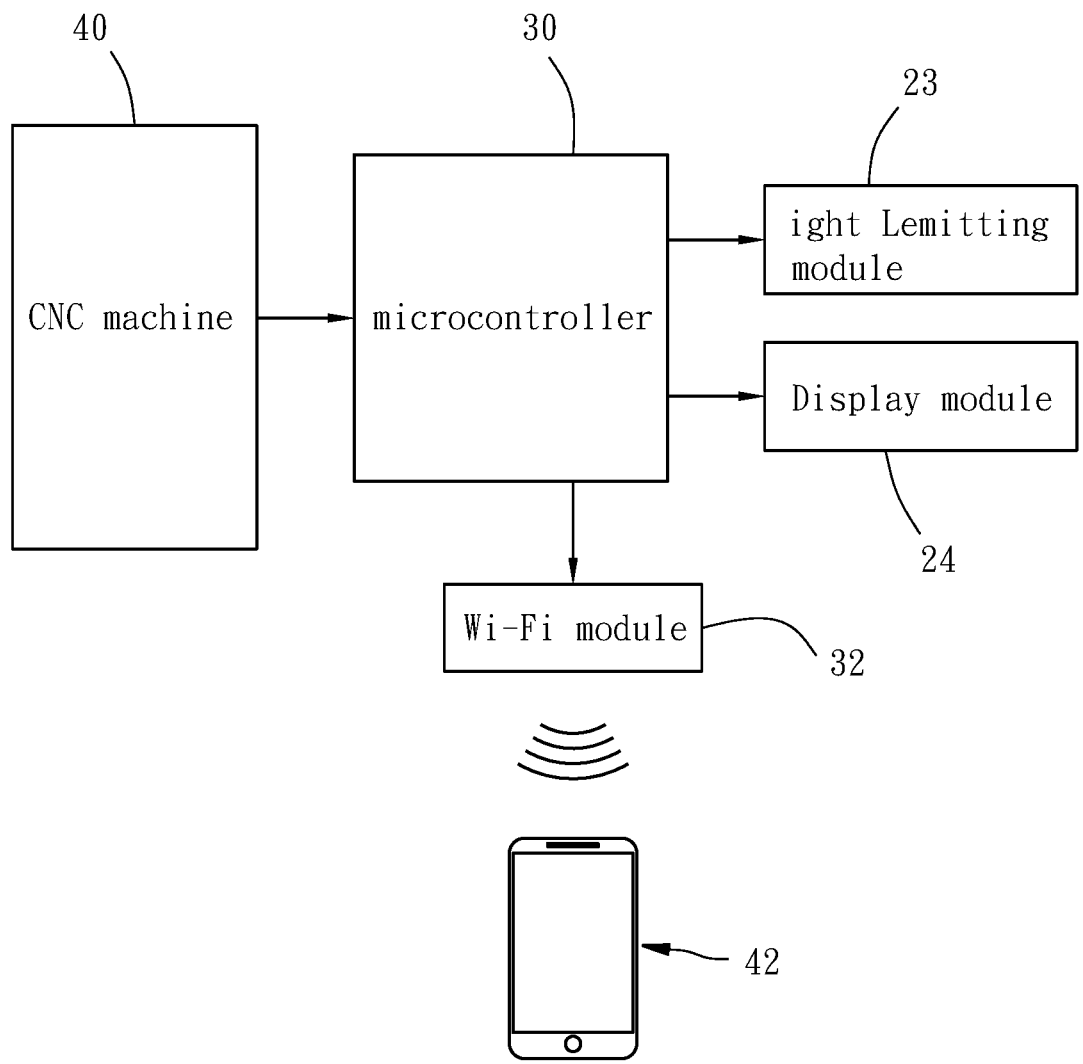
FIG. 4 is a block diagram of the intelligent display assembly according to the embodiment of the present invention cooperated with the CNC machine.
Figure 5A:
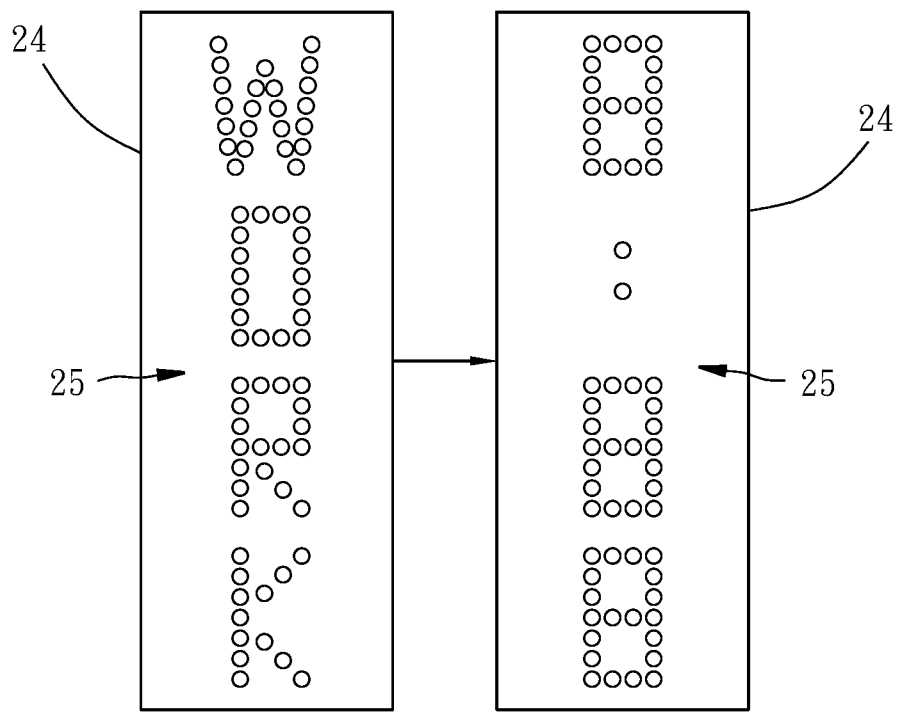
FIG. 5a is a schematic drawing of the display provided by the intelligent display assembly according to the embodiment of the present invention, showing that English and numbers are displayed alternately to indicate the processing time.
Figure 5B:
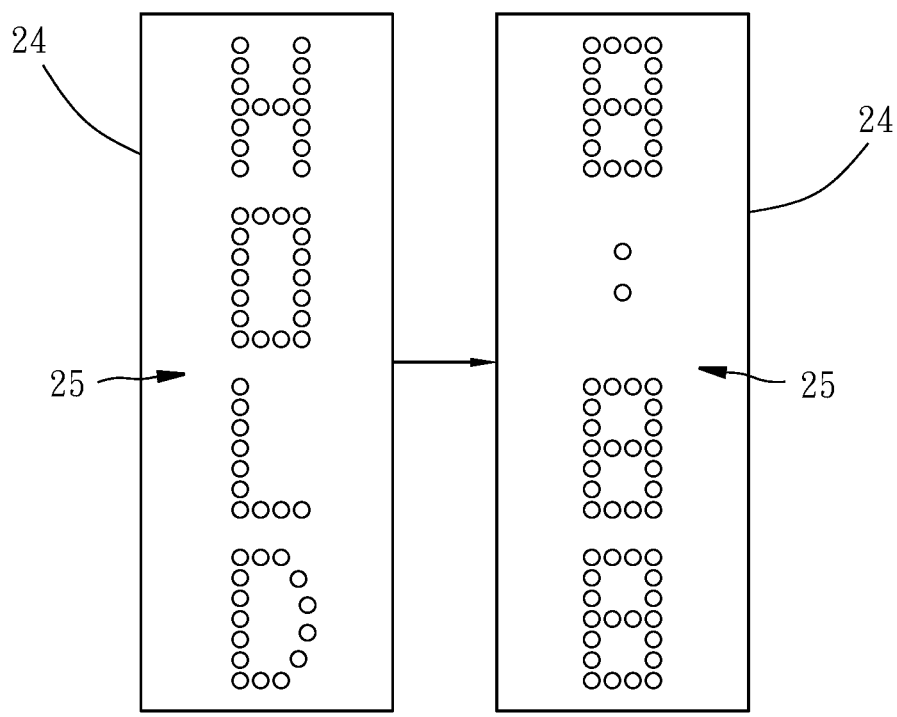
FIG. 5b is a schematic drawing of the display provided by the intelligent display assembly according to the embodiment of the present invention, showing that English and numbers are displayed alternately to indicate the waiting time.
Figure 5C:
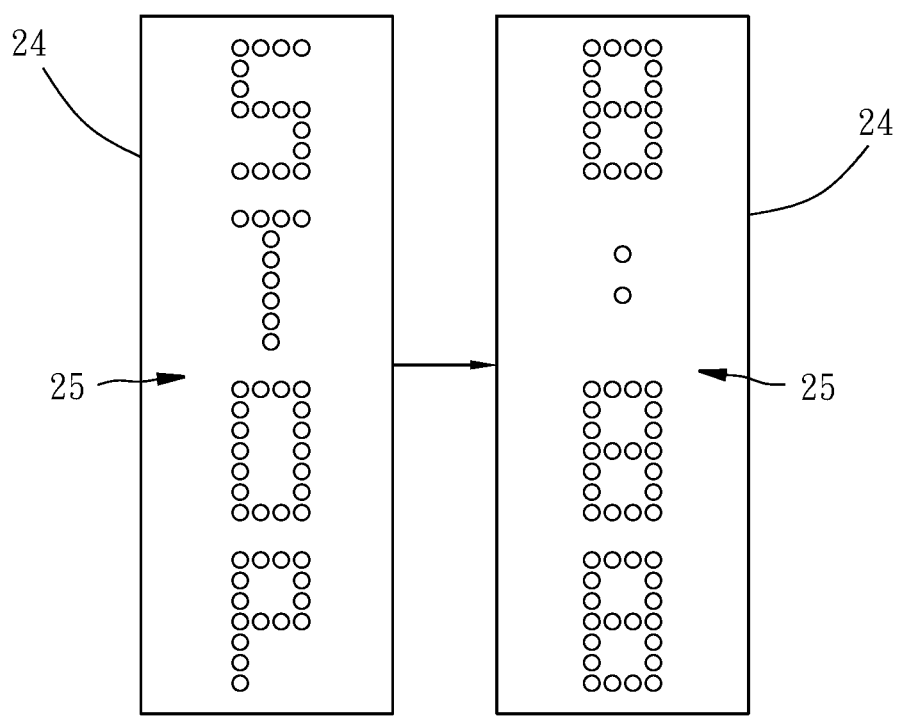
FIG. 5c is a schematic drawing of the display provided by the intelligent display assembly according to the embodiment of the present invention, showing that English and numbers are displayed alternately to indicate the failure time.
Figure 5D:
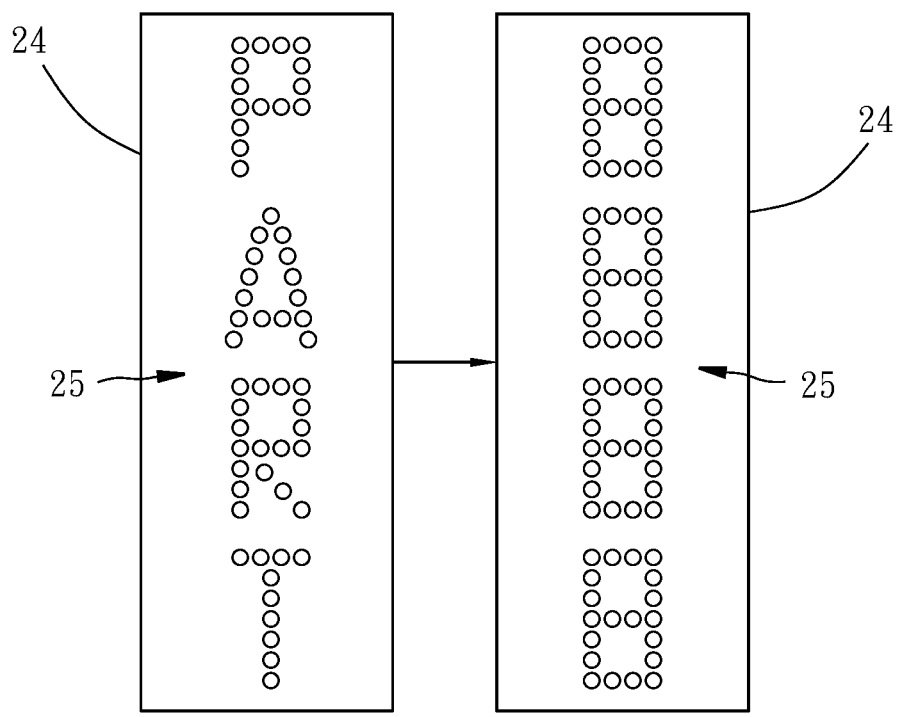
FIG. 5d is a schematic drawing of the display provided by the intelligent display assembly according to the embodiment of the present invention, showing that English and numbers are displayed alternately to indicate the processing quantity.

As shown in FIG. 4, the microcontroller 30 is electrically connected with the CNC machine 40 for receiving an operating status signal outputted by the CNC machine 40, thereby monitoring the operating status of the CNC machine 40, and further, the microcontroller 30 is electrically connected with the light emitting module 23 and the display module 24 so as to control the light emitting module 23 to emit light and control the display module 24 to display the processing information 25 as shown in FIGS. 5a-5d in accordance with the operating status signal. It needs to be added here that the light emitted by the light emitting module 23 has different colors according to different processing information 25. For example, when the light emitting module 23 emits green light, English and numbers are displayed alternately to indicate the processing time (as shown in FIG. 5a). When the light emitting module 23 emits yellow light, English and numbers are displayed alternately to indicate the waiting time (as shown in FIG. 5b). When the light emitting module 23 emits red light, English and numbers are displayed alternately to indicate the failure time (as shown in FIG. 5c). When the light emitting module 23 emits green light, English and numbers are displayed alternately to indicate the processing quantity (as shown in FIG. 5d).

On the other hand, the aforesaid processing information 25 can be transmitted by the microcontroller 30 to a smart phone 42 through a wireless transmission path (such as Wi-Fi). Going a step further, as shown in FIG. 4, the microcontroller 30 is connected with an access point via a Wi-Fi module 32, and then the smart phone 42 is allowed to use Wi-Fi to connect with the aforesaid access point through a wireless broadband router. As a result, the operator can use the app interface of the smart phone 42 to monitor the operating status and work efficiency of all CNC machines 40, thereby achieving the effect of Industry 4.0.

As indicated above, the intelligent display assembly 10 of the present invention provides different processing information 25 with light of different colors to the operator in real time, thereby enhancing the operator's management efficiency of the CNC machine 40 and achieving the goals of Industry 4.0.

What is claimed is:

1. An intelligent display assembly for a computer numeric control machine, comprising:
   a display for mounting to the computer numeric control machine, the display including a display module and a light emitting module opposite to the display module; and
   a microcontroller for electrically connecting with the computer numeric control machine for receiving an operating status signal outputted by the computer numeric control machine, the microcontroller being electrically connected with the light emitting module and the display module so as to control the light emitting module to emit light and control the display module to display processing information in accordance with the operating status signal;
   wherein the display further includes a base and a transparent lampshade disposed on the base; the base is configured to be a cylinder and the base includes a front arc surface and a back arc surface; the light emitting module is disposed at the back arc surface of the base and the display module is disposed at the front arc surface of the base; the display module and the light emitting module are covered by the transparent lampshade;
   wherein the processing information includes processing time, processing quantity, waiting time, and failure time;
   wherein when the light emitting module emits green light, English text and numbers are displayed by the display module alternately to indicate the processing time; when the light emitting module emits yellow light, English text and numbers are displayed by the display module alternately to indicate the waiting time; when the light emitting module emits red light, English text and numbers are displayed by the display module alternately to indicate the failure time; when the light emitting module emits green light, English text and numbers are displayed by the light emitting module alternately to indicate the processing quantity.

2. The intelligent display assembly as claimed in claim 1, wherein the processing information is transmitted by the microcontroller to a smart phone through a wireless transmission path.

3. An intelligent display assembly for a computer numeric control machine, comprising:
   a display for mounting to the computer numeric control machine, the display including a display module and a light emitting module opposite to the display module; and
   a microcontroller for electrically connecting with the computer numeric control machine for receiving an operating status signal outputted by the computer numeric control machine, the microcontroller being electrically connected with the light emitting module and the display module so as to control the light emitting module to emit light and control the display module to display processing information in accordance with the operating status signal;
   wherein the base is a square prism; the display includes two said light emitting modules and two said display modules; one of the light emitting modules and one of the display modules are disposed at two opposite rectangular surfaces of the base, and the other of the light emitting modules and the other of the display modules are disposed at the other two opposite rectangular surfaces of the base;
   wherein the processing information includes processing time, processing quantity, waiting time, and failure time;
   wherein when the light emitting module emits green light, English text and numbers are displayed alternately to indicate the processing time; when the light emitting module emits yellow light, English text and numbers are displayed alternately to indicate the waiting time; when the light emitting module emits red light, English text and numbers are displayed alternately to indicate the failure time; when the light emitting module emits green light, English text and numbers are displayed alternately to indicate the processing quantity.

* * * * *